United States Patent
Dumitrescu et al.

(10) Patent No.: US 9,652,184 B2
(45) Date of Patent: May 16, 2017

(54) WORKFLOW REGENERATION IN A PRINT SHOP ENVIRONMENT

(75) Inventors: Tiberiu Dumitrescu, Simi Valley, CA (US); Michael Raines, Austin, TX (US); Daniel Hufnagel, Williamson, NY (US)

(73) Assignee: Ricoh Company, Ltd., Tokyo (JP)

( * ) Notice: Subject to any disclaimer, the term of this patent is extended or adjusted under 35 U.S.C. 154(b) by 1209 days.

(21) Appl. No.: 13/036,147

(22) Filed: Feb. 28, 2011

(65) Prior Publication Data

US 2012/0218590 A1 Aug. 30, 2012

(51) Int. Cl.
*G06F 3/12* (2006.01)
*G06Q 10/10* (2012.01)

(52) U.S. Cl.
CPC ............ *G06F 3/1205* (2013.01); *G06F 3/121* (2013.01); *G06F 3/1261* (2013.01); *G06F 3/1275* (2013.01); *G06F 3/1282* (2013.01); *G06F 3/1288* (2013.01); *G06Q 10/103* (2013.01)

(58) Field of Classification Search
None
See application file for complete search history.

(56) References Cited

U.S. PATENT DOCUMENTS

| | | | | |
|---|---|---|---|---|
| 6,509,974 B1 * | 1/2003 | Hansen | ................ | G06F 3/1205 358/1.12 |
| 6,573,910 B1 * | 6/2003 | Duke | .................... | G06F 9/4843 358/1.14 |
| 6,825,943 B1 * | 11/2004 | Barry | ................ | G06K 15/1857 358/1.1 |
| 7,051,328 B2 * | 5/2006 | Rai | ........................ | G06Q 10/10 718/100 |
| 7,065,567 B1 * | 6/2006 | Squires | ................. | G06F 3/1208 358/1.12 |
| 7,079,266 B1 * | 7/2006 | Rai | ........................ | G06F 3/1211 358/1.13 |
| 7,099,027 B1 * | 8/2006 | Barry | .................... | G06F 3/1212 358/1.15 |
| 7,125,179 B1 * | 10/2006 | Rai | ....................... | G06F 3/1208 358/1.13 |

(Continued)

FOREIGN PATENT DOCUMENTS

| | | |
|---|---|---|
| EP | 1184779 A2 | 3/2002 |
| EP | 1320008 A2 | 6/2003 |

*Primary Examiner* — Ted Barnes
(74) *Attorney, Agent, or Firm* — Duft Bornsen & Fettig LLP

(57) ABSTRACT

Systems and methods are provided for regenerating workflows for print jobs at a print shop in response to changed conditions. The system identifies a first workflow of print shop activities for a print job, and directs resources of the print shop to perform the activities of the first workflow. The system also stores rules that describe activities at the print shop. Further, the system detects a triggering event and halts processing of the first workflow. The system identifies rules defined for the customer, identifies activities available at the print shop, and generates a second workflow for the print job based on the changed condition, the rules defined for the customer, the available activities, and a job ticket of the print job. The system further directs the resources of the print shop to perform the activities of the second workflow.

20 Claims, 5 Drawing Sheets

(56) References Cited

U.S. PATENT DOCUMENTS

| | | | | |
|---|---|---|---|---|
| 7,148,985 B2* | 12/2006 | Christodoulou | ...... | G06F 3/1204 358/1.13 |
| 7,558,638 B2* | 7/2009 | Chang | ............... | G05B 19/4184 700/100 |
| 7,589,851 B2* | 9/2009 | De Bie | ................ | G06F 3/1205 358/1.15 |
| 7,626,717 B2* | 12/2009 | Rai | ....................... | G06F 3/1214 358/1.13 |
| 7,707,153 B1* | 4/2010 | Petito | .................... | G06Q 10/06 707/999.101 |
| 8,120,801 B2* | 2/2012 | Zhang | .................... | G06F 3/1208 358/1.13 |
| 8,259,321 B2* | 9/2012 | Zhang | .................... | G06F 3/1208 358/1.12 |
| 8,284,423 B2* | 10/2012 | Jahn | ....................... | G06Q 10/06 358/1.15 |
| 8,427,670 B2* | 4/2013 | Rai | ...................... | G06Q 10/06 358/1.13 |
| 8,650,152 B2* | 2/2014 | Dettinger | ............... | G06Q 10/06 707/602 |
| 9,329,808 B2* | 5/2016 | Dumitrescu | ......... | G06F 3/1204 |
| 2002/0071134 A1* | 6/2002 | Jackson | ................ | G06F 3/1217 358/1.13 |
| 2003/0041765 A1* | 3/2003 | Hill | ....................... | G06Q 30/08 101/484 |
| 2003/0061178 A1* | 3/2003 | Ogawa | ................... | G06Q 30/06 705/408 |
| 2003/0160993 A1* | 8/2003 | Kang | .................... | G06F 3/1204 358/1.15 |
| 2003/0177082 A1* | 9/2003 | Buckwalter | ............ | G06Q 40/00 705/36 R |
| 2003/0212611 A1 | 11/2003 | Barrott et al. | | |
| 2004/0006522 A1* | 1/2004 | Keane | .................... | G06Q 40/00 705/35 |
| 2004/0068424 A1* | 4/2004 | Lee | ............... | G06Q 10/063114 705/7.15 |
| 2004/0111430 A1* | 6/2004 | Hertling | ................. | G06Q 10/06 |
| 2004/0145771 A1* | 7/2004 | Stringham | ............. | G06K 15/00 358/1.15 |
| 2004/0184061 A1* | 9/2004 | Christiansen | ........... | G06F 3/121 358/1.13 |
| 2004/0196470 A1* | 10/2004 | Christiansen | ......... | G06F 3/1204 358/1.1 |
| 2004/0196493 A1* | 10/2004 | Christiansen | ......... | G06F 3/1204 358/1.15 |
| 2005/0065830 A1* | 3/2005 | Duke | .................... | G06Q 10/04 705/7.21 |
| 2005/0096770 A1* | 5/2005 | Chua | ................ | G05B 19/41865 700/102 |
| 2005/0151993 A1* | 7/2005 | Gartstein | ............. | G06F 3/1204 358/1.15 |
| 2005/0154625 A1* | 7/2005 | Chua | .................... | G06Q 10/06 700/100 |
| 2005/0248804 A1* | 11/2005 | Goel | .................... | G06F 3/1275 358/1.15 |
| 2005/0275875 A1* | 12/2005 | Jennings | ............... | G06F 3/1205 358/1.15 |
| 2006/0039026 A1* | 2/2006 | Lofthus | .............. | H04N 1/00954 358/1.15 |
| 2006/0044597 A1* | 3/2006 | Dumitrescu | ....... | H04N 1/00278 358/1.15 |
| 2006/0092467 A1* | 5/2006 | Dumitrescu | ....... | H04N 1/00278 358/1.15 |
| 2006/0149755 A1* | 7/2006 | Marshall | ................. | B43M 3/04 |
| 2006/0187484 A1* | 8/2006 | Noda | .................... | G06F 3/1208 358/1.15 |
| 2007/0070379 A1* | 3/2007 | Rai | ....................... | G06Q 10/06 358/1.13 |
| 2007/0091355 A1* | 4/2007 | Rai | ....................... | G06Q 10/06 358/1.15 |
| 2007/0124182 A1* | 5/2007 | Rai | .................... | G06Q 10/0639 705/7.38 |
| 2007/0177191 A1* | 8/2007 | Eschbach | ............... | G03G 21/02 358/1.15 |
| 2007/0185777 A1 | 8/2007 | Pyle et al. | | |
| 2007/0236708 A1* | 10/2007 | Jahn | ....................... | G06Q 10/06 358/1.6 |
| 2007/0242303 A1* | 10/2007 | Barry | .................... | G06F 3/1212 358/1.15 |
| 2007/0247657 A1* | 10/2007 | Zhang | .................. | G06F 3/1208 358/1.15 |
| 2007/0247659 A1* | 10/2007 | Zhang | .................. | G06F 3/1208 358/1.15 |
| 2008/0137108 A1 | 6/2008 | Song et al. | | |
| 2008/0144080 A1* | 6/2008 | Randt | .................... | G06F 3/121 358/1.15 |
| 2008/0180728 A1* | 7/2008 | Sekine | .................. | G06F 3/1204 358/1.15 |
| 2008/0256541 A1* | 10/2008 | Rai | ....................... | G06F 9/4843 718/101 |
| 2008/0285067 A1* | 11/2008 | Rai | ....................... | G06Q 10/06 358/1.15 |
| 2008/0291502 A1* | 11/2008 | Horikawa | ............ | G06K 9/2054 358/448 |
| 2009/0033977 A1* | 2/2009 | Morales | ................ | G06F 3/1206 358/1.15 |
| 2009/0043628 A1* | 2/2009 | Gombert | ............... | G06Q 10/06 705/7.22 |
| 2009/0063710 A1* | 3/2009 | Sekine | .................. | G06F 3/1285 710/1 |
| 2009/0063718 A1* | 3/2009 | Sekine | .................. | G06F 9/4411 710/8 |
| 2009/0109464 A1* | 4/2009 | Knodt | .................... | G06F 3/1211 358/1.15 |
| 2009/0244600 A1* | 10/2009 | Haycock | ................ | G06Q 30/04 358/1.15 |
| 2009/0251721 A1* | 10/2009 | Knodt | .................... | G06Q 10/06 358/1.15 |
| 2009/0279123 A1* | 11/2009 | Sekine | .................. | G06Q 10/10 358/1.15 |
| 2009/0279124 A1 | 11/2009 | Liu et al. | | |
| 2009/0279125 A1* | 11/2009 | Liu | ....................... | G06F 3/1205 358/1.15 |
| 2009/0281862 A1* | 11/2009 | Conescu | ............ | G06Q 10/0633 705/7.27 |
| 2009/0282412 A1* | 11/2009 | Sekine | .................. | G06F 9/5011 718/102 |
| 2010/0053657 A1* | 3/2010 | Weber | ................. | B41F 33/0009 358/1.13 |
| 2010/0060909 A1* | 3/2010 | Conescu | ............... | G06F 3/1204 358/1.9 |
| 2010/0091327 A1* | 4/2010 | Tamura | ............. | H04N 1/00222 358/1.15 |
| 2010/0141981 A1* | 6/2010 | Mizutani | ............... | G06F 21/608 358/1.14 |
| 2010/0157371 A1* | 6/2010 | Miyata | .................. | G06F 3/1204 358/1.15 |
| 2010/0195140 A1* | 8/2010 | Shepherd | .............. | G06F 3/1204 358/1.15 |
| 2010/0231968 A1* | 9/2010 | Hirasawa | .............. | G06F 3/1204 358/1.15 |
| 2010/0250267 A1* | 9/2010 | Brenner | ............... | G06Q 10/101 705/1.1 |
| 2011/0063655 A1* | 3/2011 | Tian | .................... | H04N 1/00209 358/1.15 |
| 2011/0075195 A1* | 3/2011 | Cain | .................... | G06F 3/1205 358/1.15 |
| 2011/0090529 A1 | 4/2011 | Hertling | | |
| 2011/0170893 A1 | 7/2011 | Nishikawa | | |
| 2011/0199646 A1* | 8/2011 | Homma | .............. | H04N 1/00204 358/1.15 |

(56) References Cited

U.S. PATENT DOCUMENTS

2012/0057191 A1* 3/2012 Gnanasambandam ... G06F 3/1211
    358/1.15
2012/0092688 A1* 4/2012 Pangrazio, III ....... G06F 3/1206
    358/1.13
2012/0188587 A1* 7/2012 Gaertner ............... G06F 3/1213
    358/1.15
2012/0212771 A1* 8/2012 Goddard ............... G06F 3/1204
    358/1.15

* cited by examiner

WORKFLOW REGENERATION IN A PRINT SHOP ENVIRONMENT

FIELD OF THE INVENTION

The invention relates to the field of print job management, and in particular, to regenerating workflows in a print shop environment.

BACKGROUND

Print shops are typically medium or large scale facilities capable of supplying printing services to meet a variety of customer demands. For example, print shops are often used to print documents for mass-mailing (e.g., customer bills, advertisements, etc.). Because print shops engage in printing on a scale that is hard to match, their customer base is usually varied. Print shop customers may therefore include both large institutional customers (e.g., credit card companies and banks), and small customers (e.g., small businesses and churches).

Print shops are generally arranged to print incoming jobs from customers in a way that is economical, yet fast. Thus, print shops often include a number of high-volume printers capable of printing incoming jobs quickly and at high quality. Print shops also typically include post-printing devices that are used to process the printed documents of each job (e.g., stackers, staplers, cutters, binders, etc.). Print shops may also provide digital/web publishing, e-mail, or other multimedia services to customers. Because print shops serve a variety of customers, they are often tasked with processing jobs that have varying printing formats, delivery dates, and media requirements. Print shops therefore often use a centralized print server that coordinates activity between printers and other devices of the print shop.

Customers submit their print jobs to print shops in a variety of formats. Along with the print data itself, a print job may include a job ticket describing what the customer wants (e.g., deliverable products, deadlines, e-mail blasts, etc.). For example, a customer may request that the print data be published at a web page and may further request to receive three copies of a printed document made from the print data. Customers may communicate their service requests to the print shop in different ways. For example, a customer may use a Web-to-Print application that generates an XML or JDF file for the print shop, or a customer may simply telephone a print shop operator to request print shop services.

As jobs are received at a print shop from different customers, each job ticket may include different requested services. To achieve each customer service request, a print shop performs a set of print shop activities. For example, to print a bound document, a print shop may engage in activities such as "pre-flight" review of print data, printing the document, post-print binding the document, physically shipping the document to the customer, and billing the customer. A customer's service requests can vary with each incoming job, and print shop devices and personnel perform different activities to process each incoming job.

Even after activities for a print job have been scheduled and the print shop has begun processing the job, it may be desirable to alter the workflow of scheduled activities. For example, a customer may change their mind as to how they want the print job to be processed (e.g., a customer may request a book to be bound as a paperback novel instead of a hardback novel), or a print shop activity may become unavailable (e.g., due to equipment failure). In these circumstances, print shop operators desire methods for quickly and easily generating a new workflow to perform for print jobs in order to meet the changed circumstances of the print shop.

SUMMARY

Embodiments described herein include systems and methods that regenerate workflows in response to changing circumstances. The system detects a triggering event, and halts processing of a workflow for a print job responsive to detecting the triggering event. The system then identifies a set of rules defined for the customer that submitted the print job. The system revises the workflow based upon available activities in the print shop, a job ticket of the print job, and rules defined for the customer, in order to respond to the changed circumstances. Thus, a custom workflow may be generated to replace an outdated workflow for a print job.

One embodiment is a system that includes a resource manager, a memory, and a workflow generator. The resource manager identifies a first workflow comprising a first ordered set of print shop activities for a print job of a customer, and directs resources of a print shop to perform the activities of the first workflow. The memory stores rules defined for customers that describe logical relationships of activities at the print shop. The resource manager also detects a triggering event indicating a changed condition, and halts processing of the first workflow responsive to detecting the triggering event. The workflow generator accesses the memory to identify rules defined for the customer, identifies activities available at the print shop, and generates a second workflow for the print job based on the changed condition indicated by the triggering event, the rules defined for the customer, the available activities, and a job ticket of the print job. The resource manager further directs the resources of the print shop to perform the activities of the second workflow.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
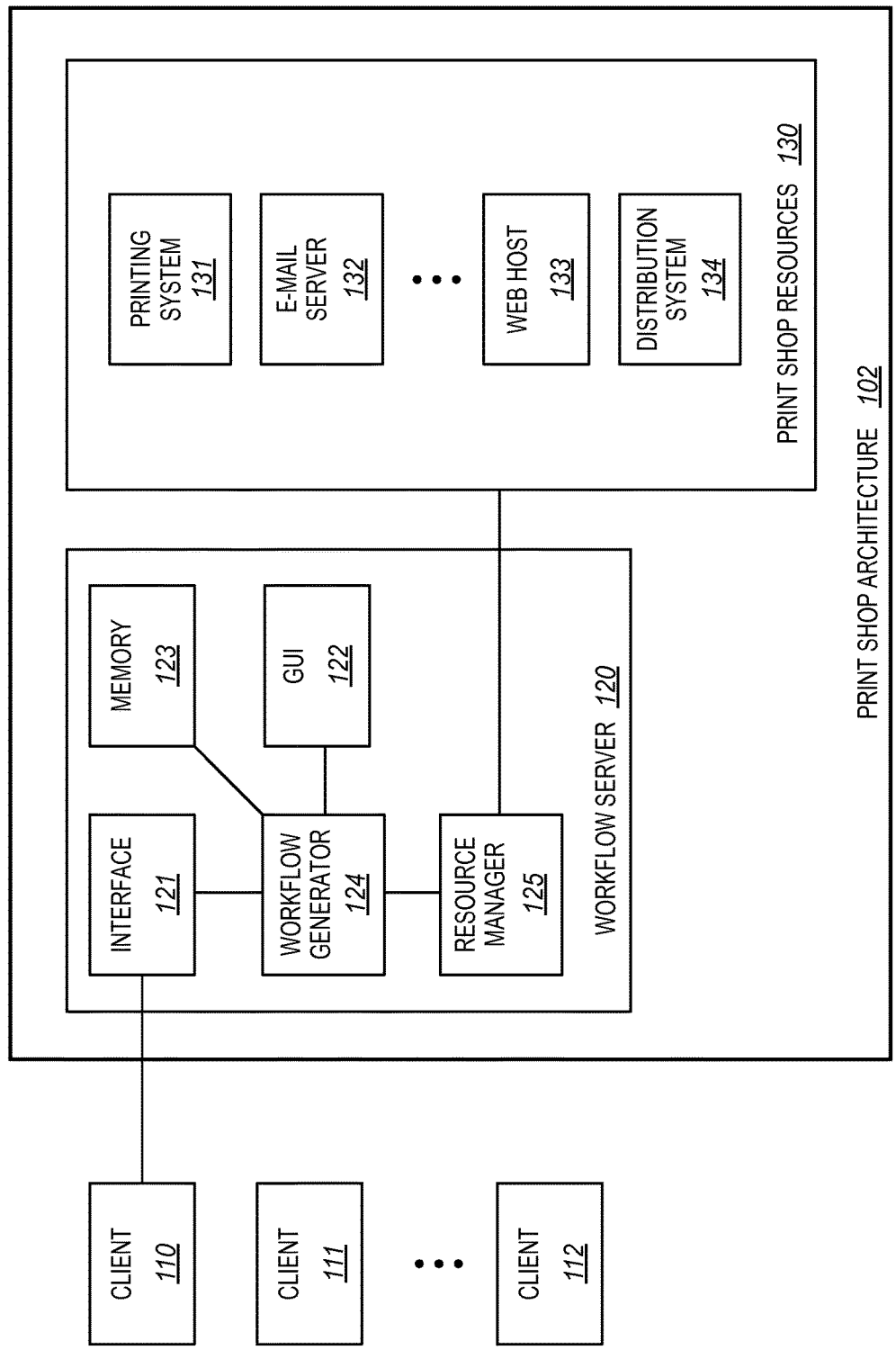
FIG. 1 is a block diagram illustrating a print shop architecture in an exemplary embodiment.

FIG. 1 is a block diagram illustrating a print shop architecture 102 in an exemplary embodiment. Print shop architecture 102 includes workflow server 120, which functionally connects one or more clients 110-112 to print shop resources 130. Clients 110-112 may be servers or software applications used by print shop customers. Clients 110-112 submit print data and job tickets that describe how the print data will be processed to interface 121. Workflow server 120 generates custom workflows for incoming print jobs, and manages print shop resources 130 in accordance with these workflows. The custom workflows are generated based on rules for the print shop, a job ticket of the print job, and activities available at the print shop.

Clients 110-112 may serve banks, credit card companies, or other customers having printing and document delivery needs (e.g., monthly bank statements, monthly credit card bills, etc.). Clients 110-112 may also serve customers with digital printing and publishing needs (e.g., needs for e-mail services, web publishing services, and others). Information describing the services requested by the customer may be included in job tickets sent by clients 110-112.

Print shop resources 130 include the devices and components of the print shop that are used to perform print shop activities. For example, print shop resources 130 may include personnel, printers, post-printing machinery, e-mail or web publishing servers, media, ink, firmware versions for print shop devices, and others. Print shop resources 130 may exist within the confines of the print shop itself, or may comprise off-site devices and functional components managed by workflow server 120. The print shop resources 131-134 illustrated in FIG. 1 are merely meant to provide an example of the variety of print shop resources 130 that may be provided. For example, print shop resources 130 may include printing system 131 for transforming print data onto a suitable printable medium, such as paper. Other resources may include e-mail server 132 for generating e-mails, web host 133 for generating and hosting web pages or other internet content, and distribution system 134 for packaging and shipping printed documents.

While in operation, workflow server 120 identifies available activities that may be performed by print shop resources 130. Workflow server 120 may determine available print shop activities based upon the nature of print shop resources 130. For example, when print shop resources 130 include e-mail server 132, available activities may include generating e-mails, scheduling times to send e-mails, and selecting e-mail recipients. Activities may be associated with a category or type of resource (e.g., personnel, printers, servers) and may also be associated with specific named print shop resources (e.g., Susan, printing system 131, e-mail server 132).

Innumerable print shop activities may be defined, and certain print shop activities may be logically related with each other so that they have order and dependency relationships (e.g., a post-printing activity such as hole punching may depend upon the print data being successfully printed). A print shop operator may prioritize activities (e.g., to ensure that billing is the last activity performed), and may make certain activities required (e.g., billing may be required for every print job that enters the system). Furthermore, certain activities may be required, altered, or made optional based upon specific clients, customers, or information in a job ticket of the print job (e.g., customer service requests, multimedia parameters, size of the print data, format of the print data, etc.). For example, thank-you letters may be sent to high value or long-term customers, while credit checks may be performed upon new customers. The logical relationships of print shop activities are hereinafter referred to as "print shop rules" or "rules." In addition to printing activities, rules may regulate non-printing activities (e.g., billing, shipping, document review, multimedia/digital/internet activities, credit checks, etc.). In order to aid an operator of the print shop in managing rules and activities, a Graphical User Interface (GUI) 122 is provided for generation and manipulation of activities and rules. Workflow server 120 stores rules for the print shop in memory 123.

Once rules and activities have been defined, workflow generator 124 is operable to generate a workflow for a print job of a customer. Workflow generator 124 generates the workflow based on information in a job ticket of the print job (e.g., customer service requests for printing or multimedia activities, the size of a print job, etc.) and the rules (e.g., the rules for the customer). The available activities are dynamically scheduled into the customized workflow to define an ordered set of activities to perform (including, for example, activities that run in parallel).

Resource manager 125 of workflow server 120 analyzes the generated workflow and directs print shop resources 130 to perform the activities defined by the workflow for a given print job. In one embodiment, resource manager 125 identifies activities that relate to specific print shop resources 131-134 (e.g., the activity "e-mail the client a printing status report" may relate to e-mail server 132), and instructs the specific resources to perform the identified activities. Resource manager 125 may further receive feedback from print shop resources 130 (e.g., information indicating that an activity has successfully completed).

Thus, while in operation, workflow server 120 receives and processes incoming print jobs from clients 110-112. Workflow server 120 determines the customer's service requests, and dynamically generates (i.e., "from scratch") a workflow of activities to perform in order to achieve the requested services for the customer while complying with the rules of the print shop. These dynamically generated workflows are customized to each incoming job. Workflow server 120 then initiates processing of the workflow for each job. When workflow server 120 encounters a triggering event (e.g., a change in cost of a print shop resource, a change in a customer's service requests, etc.), it is operable to halt processing of a workflow for a print job and generate a revised workflow for the print job to account for the changed circumstances at the print shop.

Figure 2:
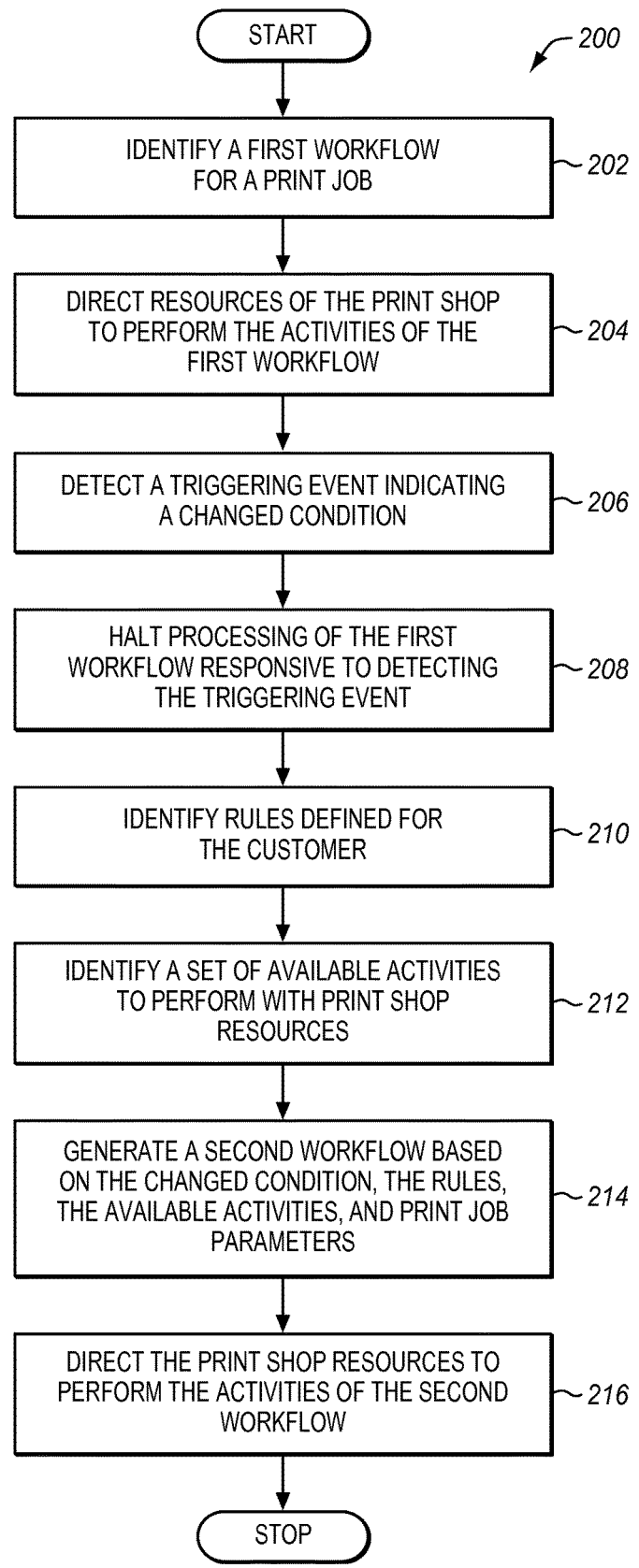
FIG. 2 is a flowchart illustrating a method for workflow regeneration in an exemplary embodiment.

FIG. 2 is a flowchart illustrating a method 200 for workflow regeneration in an exemplary embodiment. The steps of method 200 are described with reference to workflow server 120 of FIG. 1, but those skilled in the art will appreciate that method 200 may be performed in other systems or devices. The steps of the flowcharts described herein are not all inclusive and may include other steps not shown. The steps described herein may also be performed in an alternative order. Assume, for this embodiment, that workflow server 120 receives a print job from one of clients 110-112, and that workflow generator 124 has generated a first workflow for this print job.

In step 202, resource manager 125 identifies the first workflow for the print job. The first workflow includes directions explaining how the print job should be processed within the print shop. Specifically, the first workflow may comprise an ordered set of activities to perform with print shop resources 130. The first workflow may have been previously generated by workflow generator 124.

The print job related to the first workflow may be received via interface 121, and the print job may include print data and a job ticket. The job ticket may define, for example, printing or multimedia parameters, print job handling requirements, or requests of the customer. Print jobs are received from clients 110-112. Print jobs may be received in any of a variety of formats known to one of ordinary skill in the art.

In step 204, resource manager 125 directs print shop resources 130 to perform the activities of the first workflow. During this process, resource manager 125 may parse the activities in the first workflow and send instructions to print shop resources 130 that implement the activities of the workflow. Resource manager 125 may further receive feedback from print shop resources 130 indicating the success or failure of a given print shop activity.

In step 206, resource manager 125 detects a triggering event that comprises a changed condition. The triggering event may indicate a change to the nature of activities available at the print shop. For example, a triggering event may include a determination made by resource manager 125 that an activity in the current workflow cannot be completed. In one embodiment, triggering events comprise cost or load balancing determinations made by resource manager 125. For example, a triggering event may arise when resource manager 125 manages on-site and off-site resources that perform similar functions. When resource manager 125 detects that the off-site service has become cheaper than the on-site service, it may initiate a triggering event. Triggering events may also include a request from a customer that the print job be processed differently (e.g., that a novel be published online instead of in print, that a book be published in hardback as opposed to paperback, etc.). These requests may be received from clients 110-112, or they may be entered into workflow server 120 by a print shop operator via GUI 122.

In response to detecting the triggering event, workflow generator 124 may alter the available activities at the print shop. This may include configuring characteristics of an activity based on the triggering event (e.g., changing the paper used in a print activity) or may include changing the activity's priority. For example, when the triggering event comprises a determination that a new print shop resource 130 can provide new activities at a lower cost, old activities that perform the same functions may be given a lower priority or made unavailable. Thus, if the triggering event alters a print shop resource, activities available at the print shop resource may be recalibrated or reconfigured by workflow generator 124.

In step 208, resource manager 125 halts processing of the first workflow responsive to detecting the triggering event. Halting processing of the workflow generally includes pausing at the current location in the first workflow, and may further comprise sending a "stop work" or "freeze" order to any print shop resources 130 currently performing activities in the first workflow. In one embodiment, the first workflow includes activities that are performed in parallel, and resource manager 125 directs print shop resources 130 to perform activities along one of the parallel paths, while halting processing of another path (e.g., if one branch includes an activity that has become unavailable, resource manager 125 may continue processing of the branch of the workflow that does not have an unavailable activity).

Resource manager 125 may audit the activities performed by print shop resources 130. For example, resource manager 125 may send a query to print shop resources 130 that are currently performing activities in the first workflow, to request a status update for workflow activities (e.g., percentage completion, pages/copies printed, estimated time to completion, etc.).

In step 210, workflow generator 124 initiates the process of generating a second workflow by identifying rules for the print job, such as rules defined for the customer that submitted the print job. The rules may be identified based upon information in the job ticket of the print job. For example, the customer may be identified based upon information in a job ticket for the print job, information in memory 123 indicating the source of the print data, or information in the print data itself. Once the customer has been identified, workflow engine 124 may retrieve rules for the customer from memory 123. Different combinations of rules may be used to generate different workflows, and the rules for the customer may change depending on the nature of the triggering event.

In step 212, workflow generator 124 identifies a set of available activities to perform with print shop resources 130. Print shop resources 130 may automatically indicate their status (e.g., "online," "busy," "offline") and available activities (e.g., e-mail, print, bind) to workflow server 120 as a set of JDF device capabilities. Each activity may be associated with a specific capability of a print shop resource 131-134. Workflow generator 124 may determine the availability of activities based on nature of the triggering event.

In step 214, workflow generator 124 generates a customized second workflow in response to the halting of the first workflow. The second workflow is generated based on the changed condition indicated by the triggering event, the rules that apply for the job (e.g., rules for the customer), the set of available activities, and a job ticket of the print job. Custom workflows are not merely assigned from a predefined workflow template, but rather are generated "from scratch" depending upon available activities at the print shop. The second workflow comprises an ordered set of print shop activities, and is arranged to address the changed condition indicated by the triggering event. The second workflow may be created to address an estimated change in cost, time to completion, or availability of a print shop activity, and may be based upon the audit performed by resource manager 125. For example, workflow generator 124 may determine the activities that have been previously completed based upon the audit. The second workflow will therefore be different from the first workflow, because the changed circumstances of the print shop will make a different combination of activities preferable. Generating a second workflow may occur on a "backward looking" basis (i.e., the second workflow may be generated so that it does not include previously completed activities from the first workflow). Generating the workflow on a backward looking basis ensures that work is not duplicated at the print shop. In one embodiment, workflow generator 124 decides to re-implement previously completed activities from the first workflow. For example, if the triggering event is an unacceptable typo within the print data, and printing of the print data has already been completed, it may be desirable to re-implement printing in the second workflow.

To determine an activity to place at a location in the second workflow, workflow generator 124 filters the available activities based upon a job ticket of the print job and the rules that apply for the job (e.g., rules defined for the customer). In one embodiment, activities are filtered based upon the nature of the changed condition (e.g., the failure of a print shop resource, a change in cost or speed of a print shop resource, a request from a customer, etc.). Information in a job ticket of the print job may include both multimedia and print data characteristics (e.g., e-mail addresses, print data size, print data format, etc.) and customer service requests (e.g., three copies, in black and white, delivered in one week). Workflow generator 124 may analyze the services requested by the customer to generate selection criteria for the activities. The rules may also provide criteria for choosing from the available activities of the print shop, and may be specific to a client. Using the job ticket information and the rules, the available activities can be placed at specific locations in the second workflow. In one embodiment, an activity from the first workflow is associated with a functional category (e.g., printing, e-mail, web hosting, etc.). When a second workflow is created, workflow generator 124 utilizes other activities in the same category as the activity from the first workflow in order to populate the second workflow.

To aid workflow generator 124 in selecting an activity to place at a location in the workflow, print shop activities are associated with information that describes their resources, dependencies, and priorities. This information may be altered based on the changed condition. Furthermore, rules may alter the dependency, priority, and resource information for print shop activities under specific conditions. Resource information describes the resources used for a specific activity. Dependency information describes activities that are performed before the current activity. Priority information describes where the activity would be placed in the second workflow if no dependency relationships existed between activities. Workflow generator 124 positions related activities in the second workflow based upon their resource usage, dependencies, and priority.

Workflow generator 124 may position activities in the workflow based upon their resource usage, dependencies, and priority (e.g., high priority activities may be performed before low priority activities). In certain circumstances, workflow generator 124 may place a low priority activity in front of a high priority activity. This may occur when the high priority activity is dependent upon the low priority activity. For example, a printed product generally cannot be shipped before it is printed. Thus, even if the activity of printing has a lower priority than the activity of shipping, printing may be scheduled to occur before shipping. In a similar fashion, workflow generator 124 may schedule a low priority activity in front of a medium priority activity, if a high priority activity depends upon the low priority activity.

In step 216, resource manager 125 directs the print shop resources 130 to perform the activities of the second workflow. Resource manager 125 is further operable to receive feedback from each of print shop resources 130 indicating the progress of the current activity in the second workflow. Once the second workflow has been completed, resource manager 125 may delete the second workflow from memory 123, or may otherwise remove the second workflow from workflow server 120. Workflow server 120 may then continue to step 202 to process a new print job.

Using the method 200 described above, workflow server 120 may detect events that indicate changed conditions in the print shop. Further, workflow server 120 may alter print shop activities in response to the triggering condition, and generate a revised workflow to account for the changed print shop conditions.

EXAMPLES

In the following examples, additional processes, systems, and methods are described in the context of workflow server 120 as it dynamically revises customized workflows of print shop activities for incoming print jobs.

Figure 3:
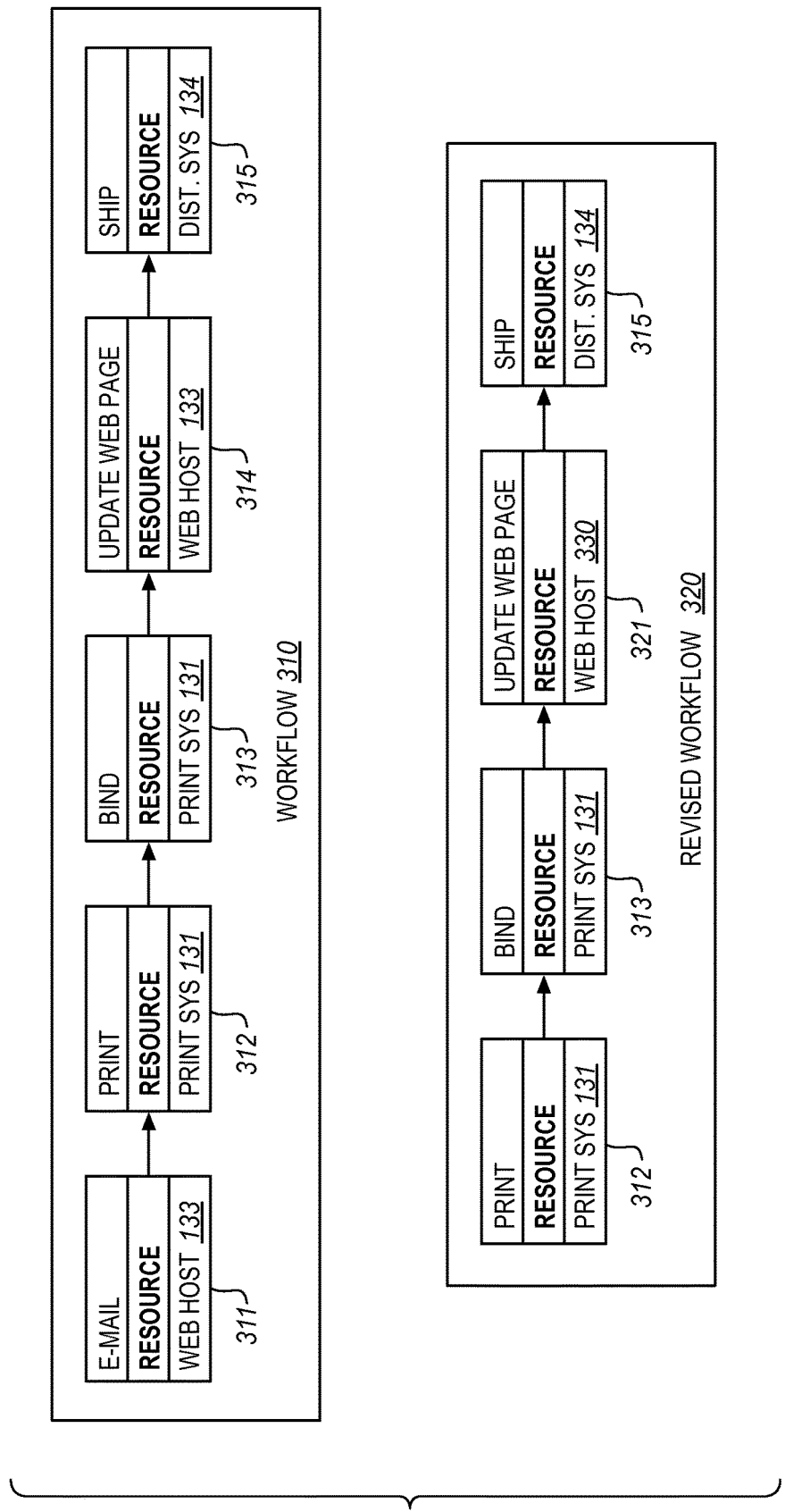
FIG. 3 is a block diagram illustrating additional details for regenerating a workflow in an exemplary embodiment.

FIG. 3 is a block diagram illustrating additional details for regenerating a workflow in an exemplary embodiment. In this example, a workflow 310 exists for a print job. Workflow 310 includes activities 311-315, and each activity in workflow 310 is associated with a print shop resource. In workflow 310, activities 311 and 314 are each associated with on-site web host 133, a web host provided and owned by the print shop. Workflow server 120 initiates processing of workflow 310, and during processing of activity 312, workflow server 120 detects a change in an off-site print shop resource: web host 330, which is owned by a third party. Web host 330 provides similar activities to web host 133, and the cost of performing activities at web host 330 has decreased significantly, to the point that activities at off-site web host 330 are now cheaper than activities at on-site web host 133. Workflow server 120 detects this change in cost, which constitutes a triggering event. Thus, workflow server 120 halts processing of the first workflow and initiates the workflow regeneration method 200 described with regard to FIG. 2.

During the workflow regeneration process, workflow generator 124 assigns activities to revised workflow 320. E-mail activity 411 has already been performed in the first workflow, and therefore workflow server 120 does not include an activity for e-mail in workflow 320. In this embodiment, each activity is given a priority based upon its estimated cost and time to completion. The activities available at web host 330, being cheaper than the activities available at web host 133, are given a higher priority than the activities of web host 133. Because of this, an update activity 321 provided by off-site web host 330 is selected instead of a similar update activity 314 provided by on-site web host 133. Workflow generator 124 then forwards revised workflow 320 to resource manager 125. Resource manager 125 then directs printing system 131 to resume printing activity 312 in accordance with revised workflow 320.

Figure 4:
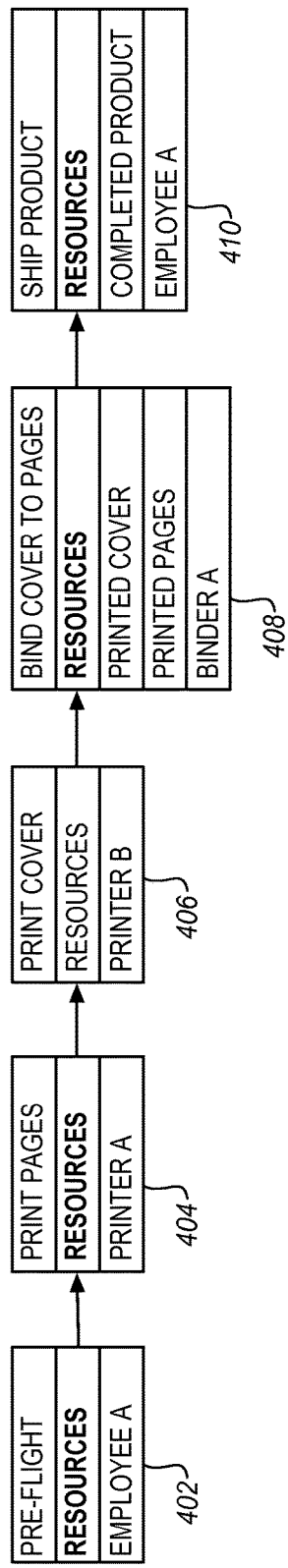
FIGS. 4 and 5 are block diagrams illustrating the creation of parallel paths for activities in a workflow in an exemplary embodiment.
Figure 5:
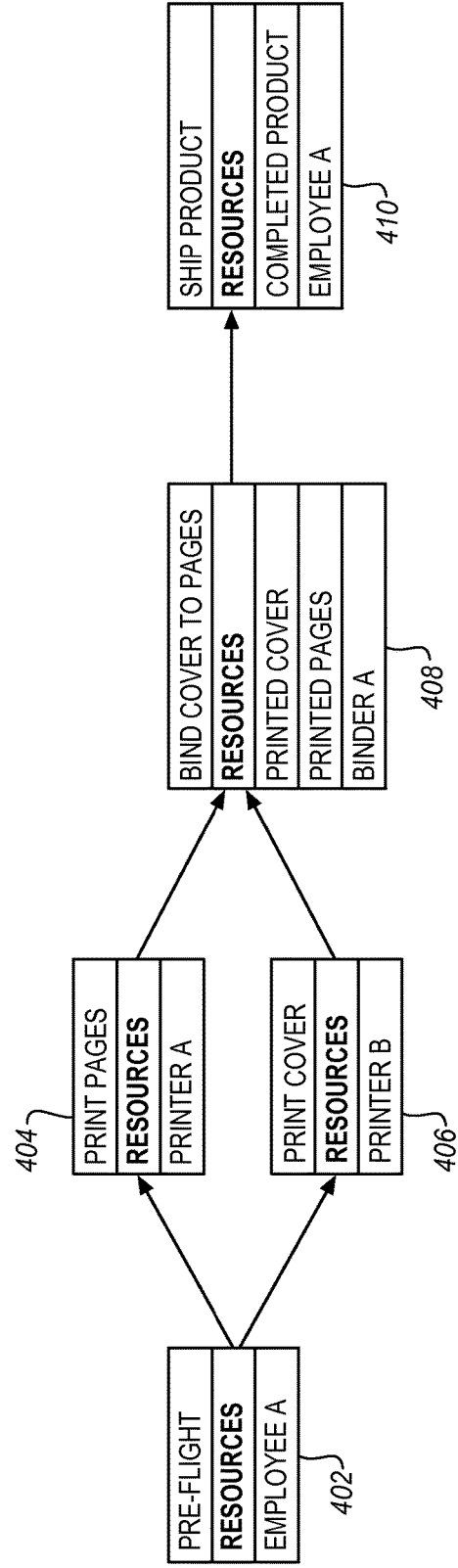

FIGS. 4 and 5 are block diagrams illustrating the creation of parallel paths for activities in a workflow in an exemplary embodiment. FIG. 4 illustrates a linear workflow that has been created by workflow generator 124. The workflow comprises activities including pre-flight 402, print pages 404, print cover 406, bind 408, and ship product 410. Each activity in the workflow is associated with a set of resources used to perform the activity. Some resources may be capable of being shared (e.g., it may be possible for e-mail server 132 to perform multiple activities in parallel), while other resources may be exclusive (e.g., printing system 131 may not be capable of performing printing activities in parallel). In this example, the linear workflow of FIG. 4 is parallelized to reduce the time taken to perform the workflow. This workflow is parallelized based upon the dependencies of the activities of the workflow, and also upon the resources utilized by the activities of the workflow. Assume, for this embodiment, that print pages 404 and print cover 406 are dependent upon pre-flight 402, that bind 408 is dependent upon both print pages 404 and print cover 406, and that ship product 410 is dependent upon bind 408. Workflow generator 124 makes the determination that print pages 404 and print cover 406 are dependent upon the same prior activity, and therefore identifies print pages 404 and print cover 406 as candidates for parallelization. Workflow generator 124 next determines that the resources used by print pages 404 and print cover 406 do not conflict with each other, and may be used at the same time (i.e., there will be no conflict if printer A is used at the same time as printer B). Because print pages 404 and print cover 406 are not dependent upon each other, and because they do not both require a resource that cannot be shared (i.e., the activities are independent), workflow generator 124 alters the workflow so that print pages 404 and print cover 406 are run in parallel in FIG. 5.

In a further example, workflow server 120 manages both on-site and off-site resources as part of print shop resources 130 (e.g., resources outside of the print shop or owned by another party). On-site and off-site resources may perform functionally similar activities (e.g., both may perform printing activities), and it may be preferable to perform certain functions with on-site activities or off-site activities depending upon the expected load at each resource (e.g., the number of activities scheduled at the print shop resource) or the cost of performing the function at each resource. For example, performing a task using an off-site resource may generally be expected to result in quicker performance of the task, but may also be more expensive. Workflow server 120 may therefore generate a set of default rules indicating when a function should be performed with activities using on- or off-site resources. In one embodiment, workflow server 120 decides whether to bypass the default rules for an incoming print job. For example, a function may be moved to off-site resources when certain cost or load balancing criteria are met (e.g., if an on-site resource is overburdened, workflow server 120 may select a similar off-site resource to perform the same function).

In a further example, workflow generator 124 determines the cost and/or resource load associated with activities in the workflow performed for incoming print jobs. For example a print shop resource may report the cost or time that it has taken to perform a given activity scheduled in a workflow for a print job, or a print shop operator may provide this information to workflow generator 124. This historic usage information may be stored in memory 123 and may be used to determine a predicted cost and/or load for each activity in the print shop. Predicted cost may depend upon, for example, a parameter of the print job (e.g., print job size) and the type of activity (e.g., color printing vs. black and white printing). Furthermore, predicted cost or load may be based upon time of day or time of year (e.g., at the end of each month, each activity may routinely encounter a significantly higher load). In order to determine a predicted cost and/or load, regression techniques may be used to generate distribution curves (e.g., linear, quadratic, power, and exponential curves) that correlate the cost or load of an activity to rules or print job parameters (e.g., cost vs. print job size, time vs. load, etc.).

In a further example, workflow server 120 groups sets of related activities in the workflow, and arranges the workflow based upon the relationships of the groups of activities. In this embodiment, groups of activities are created based upon the functions of the activities (e.g., printing, e-mail, etc.) or the resources used by the activities (e.g., printing system 131). Workflow generator 124 determines the resources, dependency, and priority of each group of activities as a whole, and generates workflows by locating the groups of activities in the workflow as if they were individual activities.

Figure 6:
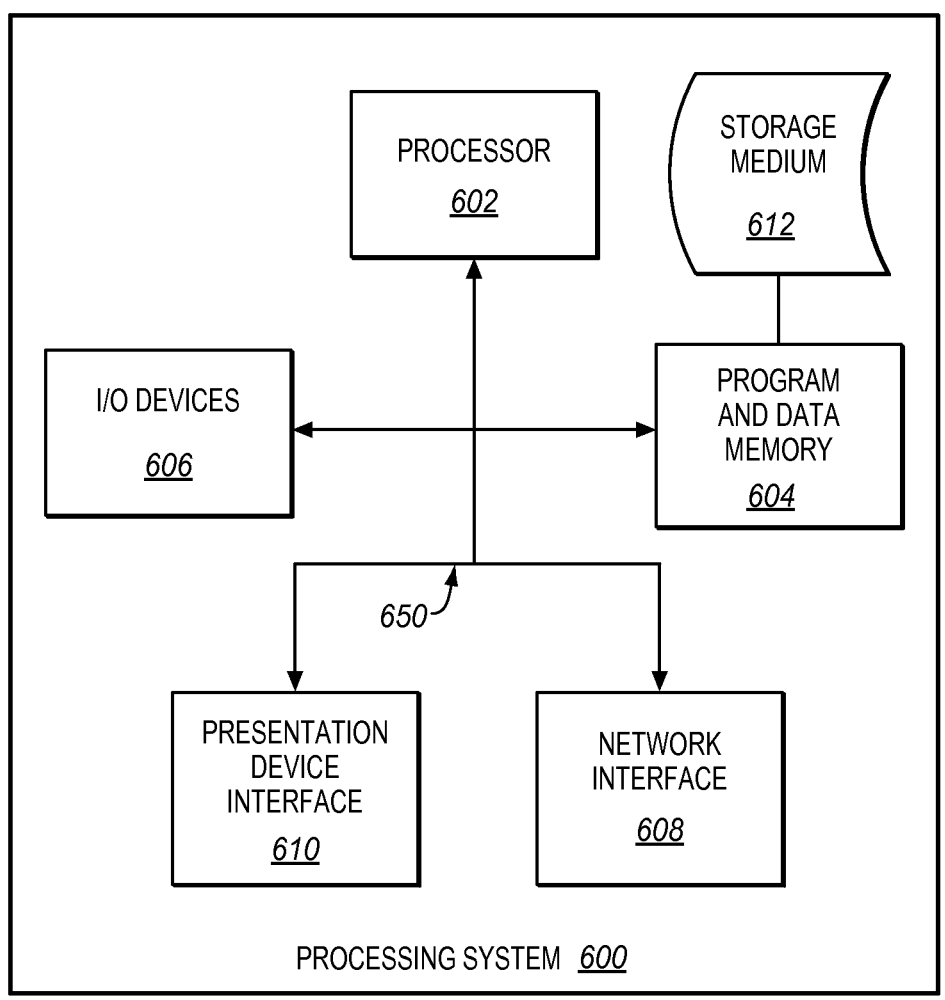
FIG. 6 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of workflow generator 120 to perform the various operations disclosed herein. FIG. 6 illustrates a processing system operable to execute a computer readable medium embodying programmed instructions to perform desired functions in an exemplary embodiment.

Processing system 600 is operable to perform the above operations by executing programmed instructions tangibly embodied on a computer readable storage medium 612. In this regard, embodiments of the invention can take the form of a computer program accessible via the computer-readable medium 612 providing program code for use by a computer or any other instruction execution system. For the purposes of this description, a computer readable storage medium 612 can be anything that can contain or store the program for use by the computer.

The computer readable storage medium 612 can be an electronic, magnetic, optical, electromagnetic, infrared, or semiconductor device. Examples of the computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 600, being suitable for storing and/or executing the program code, includes at least one processor 602 coupled to memory elements 604 through a system bus 650. The memory elements 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled to the system either directly or through intervening I/O controllers. Network adapter interfaces 608 may also be coupled to the system to enable the processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be coupled to the system to interface to one or more presentation devices, such as printing systems and displays for presentation of presentation data generated by processor 602.

Although specific embodiments were described herein, the scope of the invention is not limited to those specific embodiments. The scope of the invention is defined by the following claims and any equivalents thereof.

We claim:

1. A system comprising:
   a resource manager that identifies a first workflow comprising a first ordered set of print shop activities for a print job of a customer, directs resources of a print shop to perform the activities of the first workflow, detects a triggering event indicating a changed condition for the print shop that is independent of operator input, and halts processing of the first workflow responsive to detecting the triggering event;
   the resources, which automatically indicate their status and available activities to the resource manager, and which comprise a printer and post-printing machinery;
   a memory that stores rules defined for customers that describe logical relationships of activities at the print shop and that provide criteria for choosing from the available activities when generating a workflow; and
   a workflow generator that determines that the triggering event has resulted in a change in the available activities, accesses the memory to identify rules defined for the customer, identifies remaining activities available at the print shop after the triggering event, and generates a second workflow for the print job based on the changed condition indicated by the triggering event, the rules defined for the customer, the remaining available activities, and a job ticket of the print job,
wherein the second workflow comprises:
if there is no unacceptable condition for the print job, a second ordered set of print shop activities that is not a duplicate of the first ordered set of print shop activities, and
if there is an unacceptable condition for the print job, a second ordered set of print shop activities that re-implements at least one previously completed activity from the first workflow,
wherein the second workflow includes activities of the first workflow that have been altered based on the rules for the customer and the changed condition, the resource manager further directs the resources of the print shop to perform the activities of the second workflow for the print job, the printer prints the print job in accordance with the second workflow, and the post-printing machinery processes the print job after printing in accordance with the second workflow.

2. The system of claim 1, wherein:
responsive to detecting the triggering event, the workflow generator alters an activity available at the print shop based on the changed condition.

3. The system of claim 2, wherein:
each of the activities available at the print shop includes resource, dependency, and priority information, and the workflow generator alters at least one of resource, dependency, or priority information for the activity based on the changed condition.

4. The system of claim 1, wherein:
the changed condition comprises a change in availability of a print shop resource; and
the workflow generator generates the second workflow based upon the change in availability of the print shop resource.

5. The system of claim 1, wherein:
the available activities are grouped based upon resources used by the activities, and
the workflow generator generates workflows by locating groups of activities in the workflow as if the groups were individual activities.

6. The system of claim 1, wherein:
the changed condition comprises a change in load for a print shop resource; and
the workflow generator generates the second workflow based upon the change in load for the print shop resource.

7. The system of claim 1, wherein:
the workflow generator identifies activities that have been completed in the first workflow, and generates the second workflow based upon the activities that have been completed in the first workflow.

8. A method comprising:
identifying a first workflow comprising a first ordered set of print shop activities for a print job of a customer;
receiving information describing status and available activities for a printer and post-printing machinery;
directing resources of a print shop to perform the activities of the first workflow;
detecting a triggering event indicating a changed condition for the print shop that is independent of operator input;
determining that the triggering event has resulted in a change in the available activities;
halting processing of the first workflow responsive to detecting the triggering event;
identifying rules defined for the customer that describe logical relationships of activities at the print shop and that provide criteria for choosing from the available activities when generating a workflow;
identifying remaining activities available at the print shop after the triggering event; and
generating a second workflow for the print job based on the changed condition indicated by the triggering event, the rules defined for the customer, the remaining available activities, and a job ticket of the print job, wherein the second workflow comprises:
if there is no unacceptable condition for the print job, a second ordered set of print shop activities that is not a duplicate of the first ordered set of print shop activities, and
if there is an unacceptable condition for the print job, a second ordered set of print shop activities that re-implements at least one previously completed activity from the first workflow,
wherein the second workflow including activities of the first workflow that have been altered based on the rules for the customer and the changed condition, and
wherein the method further comprises: directing the resources of the print shop to perform the activities of the second workflow for the print job;
printing the print job in accordance with the second workflow; and
processing, via post-printing machinery, the print job after printing in accordance with the second workflow.

9. The method of claim 8, further comprising:
altering an activity available at the print shop, responsive to detecting the triggering event, based on the changed condition.

10. The method of claim 9, wherein:
each of the activities available at the print shop includes resource, dependency, and, priority information, and altering the activity comprises altering at least one of resource, dependency, or priority information for the activity based on the changed condition.

11. The method of claim 8, wherein:
the changed condition comprises a change in availability of a print shop resource; and
the second workflow is generated based upon the change in availability of the print shop resource.

12. The method of claim 8, wherein:
the available activities are grouped based upon resources used by the activities, and
the method further comprises generating workflows by locating groups of activities in the workflow as if the groups were individual activities.

13. The method of claim 8, wherein:
the changed condition comprises a change in load of a print shop resource; and
the second workflow is generated based upon the change in load of the print shop resource.

14. The method of claim 8, further comprising:
identifying activities that have been completed in the first workflow; and
generating the second workflow based upon the activities that have been completed in the first workflow.

15. A system comprising:
a resource manager that identifies a first workflow comprising a first ordered set of print shop activities for a print job, directs resources of a print shop to perform the activities of the first workflow, detects a triggering event indicating a changed condition for the print shop that is independent of operator input, and halts processing of the first workflow responsive to detecting the triggering event;

the resources, which automatically indicate their status and available activities to the resource manager, and which comprise a printer and post-printing machinery;

a memory that stores rules that describe logical relationships of activities at the print shop and that provide criteria for choosing from the available activities when generating a workflow; and a workflow generator that determines that the triggering event has resulted in a change in the available activities, accesses the memory to identify rules defined for the print job, identifies remaining activities available at the print shop after the triggering event, and generates a second workflow for the print job based on the changed condition indicated by the triggering event, the rules defined for the print job, the available activities, and a job ticket of the print job, the second workflow comprises:

if there is no unacceptable condition for the print job, a second ordered set of print shop activities that is not a duplicate of the first ordered set of print shop activities, and if there is an unacceptable condition for the print job, a second ordered set of print shop activities that re-implements at least one previously completed activity from the first workflow, wherein the second workflow includes activities of the first workflow that have been altered based on the rules for the customer and the changed condition, wherein the resource manager further directs the resources of the print shop to perform the activities of the second workflow for the print job, the printer prints the print job in accordance with the second workflow, and the post-printing machinery processes the print job after printing in accordance with the second workflow.

16. The system of claim 15, wherein:

responsive to detecting the triggering event, the workflow generator alters an activity available at the print shop based on the changed condition.

17. The system of claim 16, wherein:

each of the activities available at the print shop includes resource, dependency, and priority information, and the workflow generator alters at least one of resource, dependency, or priority information for the activity based on the changed condition.

18. The system of claim 15, wherein:

the changed condition comprises a change in availability of a print shop resource; and the workflow generator generates the second workflow based upon the change in availability of the print shop resource.

19. The system of claim 15, wherein:

the available activities are grouped based upon resources used by the activities, and the workflow generator generates workflows by locating groups of activities in the workflow as if the groups were individual activities.

20. The system of claim 15, wherein:

the changed condition comprises a change in load for a print shop resource; and the workflow generator generates the second workflow based upon the change in load for the print shop resource.

* * * * *